United States Patent [19]
Stewart

[11] Patent Number: 6,106,000
[45] Date of Patent: Aug. 22, 2000

[54] UNIVERSAL TYPE ADD ON AIR BAG INFLATOR

[76] Inventor: David A. Stewart, 874 Leeville Rd., Petal, Miss. 39465

[21] Appl. No.: 09/184,661

[22] Filed: Oct. 2, 1998

[51] Int. Cl.[7] .................................................. B60R 21/16
[52] U.S. Cl. .................... 280/728.2; 280/740; 280/730.1
[58] Field of Search ............................. 280/730.1, 730.2, 280/728.3, 741, 736, 735, 728.1, 728.2, 740

[56] References Cited

U.S. PATENT DOCUMENTS

| | | | |
|---|---|---|---|
| 5,458,364 | 10/1995 | Mueller et al. | 280/728.2 |
| 5,509,686 | 4/1996 | Shepherd et al. | 280/738 |
| 5,700,028 | 12/1997 | Logan et al. | 280/728.2 |
| 5,788,269 | 8/1998 | Jakovski et al. | 280/728.2 |
| 5,899,485 | 5/1999 | Folsom et al. | 280/728.2 |

*Primary Examiner*—Peter C. English
*Assistant Examiner*—Lynda Jasmin

[57] ABSTRACT

A universal type add on air bag inflator (2) configured in an elongated cylindrical form that is adapted to accommodate a wide range of vehicles, where inflator (2) is preferably but not limited to installation in a vehicle on the external surface of the interior facing of a vehicle forward support pillar (52) where the long axis of the inflator is mounted parallel to the long axis of the pillar. The inflator (2) includes an ignitor (14) and a pyrotechnic exploder (24) in assembly within an accommodating combustion chamber (26). Chamber (26) including the pyrotechnic assembly is accommodated within an accommodating baffle (30) where there is adapted in an uninflated state a folded air bag (36). These components in combination are accommodated within an accommodating yieldable outer shell (4). A pair of end caps (10,10) close respective open ends of the outer shell (4). Air bag (36) is adapted to be automatically inflated and developed between the occupant and interior vehicle surfaces upon activation in response to the impact of a vehicular collision. The appearance of the inflator (2) is optionally and superficially adaptable using accessory cover casing (64) or cover sleeve (70) with cap screws (72,72).

4 Claims, 8 Drawing Sheets

UNIVERSAL TYPE ADD ON AIR BAG INFLATOR

BACKGROUND OF THE INVENTION

1. Field of Invention

The present invention pertains to automotive safety devices, specifically to a universal type add on air bag inflator for safety assistance of a motor vehicle occupant in the event of an impact due to collision.

2. Description of Prior Art

Progressive efforts in improving automotive safety have produced what is now commonly called air bags. These are inflatable barriers that are designed to inflate and develop between occupants and interior vehicle surfaces during the impact of a collision. Air bags are now being installed on most vehicles during vehicle manufacture as original factory equipment. In some cases air bags can be installed after vehicle manufacture by what is known as retrofitting or as an add on accessory. Typical methods of inflation of air bags are gases stored under high pressure until released at time of deployment; or gases generated from ignition of a pyrotechnic charge; or by a hybrid gas generator which is a combination of the two aforementioned methods.

The most prevalent locations in a vehicle for installation of retrofit or add on type air bags are in the steering wheel or column, dashboard, door panel or roof lining, seat back, and within or replacing a structural element of a vehicle.

The invention of (Chandler, Jr. et al., U.S. Pat. No. 5,482,315) discloses an elongated tubular shaped hybrid gas generator inflation system for installation within a hollow steering column, or replacing a solid steering column or other structural element of a vehicle thereby saving material and weight. However, this inflation system may be costly because it necessitates continual adaptive design and complex specialized installation due to the broad range of vehicle types and manufacture. The invention of (Kithl, U.S. Pat. No. 5,366,241) discloses a pyrotechnic inflation system that is mounted overhead on the vehicle's interior roof panel in a longitudinal tunnel shaped configuration and proposes the use of an accelerometer to detect sudden deceleration; microprocessors to monitor occupant position; warning lights and printed warning notices to assist occupant in maintaining proper positioning. While this inflation system possesses relative ease of installation it is complex in operation and excessive in cost. This inflation system is also limited in application due to the many variable factors of vehicle roof construction such as a low roof design; T-Tops; removable roofs; and convertibles. Another previous invention (Offenlegunsschrift, German Patent No. 2,041,741) suggests inflation systems stowed in the roof lining or in combination within the forward and mid support pillars or rear support pillars. This inflation system offers multi-directional occupant protection but is complex in installation, expensive, and is limited in application also due to the variable factors of vehicle roof construction as previously mentioned and because of variables in support pillar construction, i.e. support pillars to narrow to accommodate these components within; or the mid and rear pillars being non-existent as with some types of sport utility vehicles and convertibles. Still another invention (Stutz, U.S. Pat. No. 5,333,898) suggests an inflation system located at an upper rear corner of a lateral window. This inflation system offers side impact proctection however, only partially covers the lateral window providing a limited protective area.

Other commonly known disadvantages of present day inflation systems have been the angle and force of inflator development directly toward the occupant, where in some cases have caused injury rather than protect; and the restricted ability of the occupant to quickly evacuate the vehicle after a collision because of location and/or configuration of the air bag once deployed even when automatically deflated. Further disadvantages of retrofit or other inflation systems are cost and requiring installation at specialized shops.

SUMMARY OF THE INVENTION

The present invention is an air bag inflator for the protection of an occupant of a vehicle during an impact due to vehicular collision. The inflator is an elongated cylindrical shape and is dimensioned to preferably (but not limited to) being installed on a vehicle's forward support pillar or pillars (single or dual installation). An air bag in an uninflated state is folded and compacted within the accommodating inflator and the inflator includes a stored pyrotechnic means that is connected to an initiator for automatic inflation and development of the compacted air bag in response to the impact (25 to 35 mph) of a collision. The present invention is universal in fit capability to accommodate a very wide range of type and age of vehicles, is simplistic in operation and installation; and is a generally affordable alternative to present day retrofit or other complex and cost prohibitive inflation systems. Accordingly several objects and advantages of the present invention are to provide:

(a.) A single type of add on air bag inflator that can accommodate an extremely wide range of vehicles such as sedans, convertibles, recreational and sport utility vehicles, including trucks, vans and buses without having to be fitted specifically to a particular type, make, or year of vehicle.

(b.) An inflator that is preferably but not limited to installing longitudinally along the external surface of the interior facing of a vehicles forward support pillar or pillars (driver and/or passenger installation).

(c.) An inflator that is pyrotechnically and automatically deployed and provides automatic pressure relief once full development has occurred.

(d.) An inflator that is sufficiently simplistic in operation and installation to be competitively marketable and installable at common retail automotive supply and service centers.

(e.) Air bag protection that is generally affordable and can be used in older vehicles that have no air bag protection, or can be used on the passenger side of somewhat newer vehicles with factory installed driver's side only air bag and can be used in future aging or damaged vehicles with spent or non operational air bags where restoring the original equipment air bags would be expensive and impractical even though the vehicle is still in use.

(f.) An air bag that develops at a relatively even level with the occupants head and upper torso and develops three dimensionally between the occupant and interior vehicle surfaces but develops in a lateral direction rather than developing directly toward the occupant.

(g.) Air bag development beginning from an elongated frontal area of the cylindrically shaped inflator rather than air bag development beginning from a narrow area of one end of the inflator.

A further object and advantage is to provide an air bag system that includes means for an optional cover accessory that alters the appearance of the inflator without affecting or interfering with the intended inflator operation or function.

These and other objects and advantages will become apparent from the detailed description and drawings which follow.

DETAILED DESCRIPTION OF THE INVENTION

Figure 2:
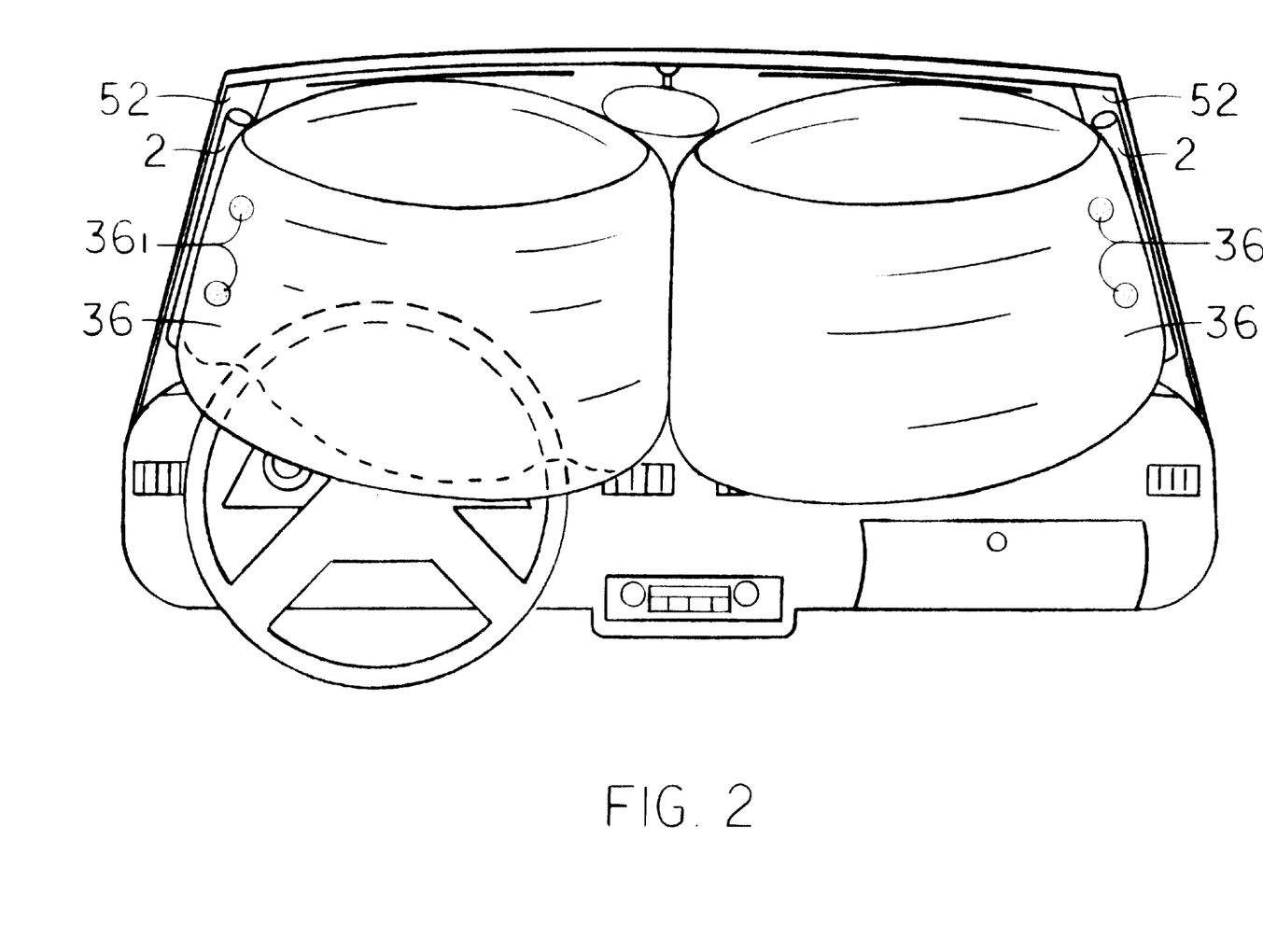
FIG. 2 Is an elevation of a typical vehicle forward interior displaying a dual air bag inflator installation and deployment.
Figure 3:
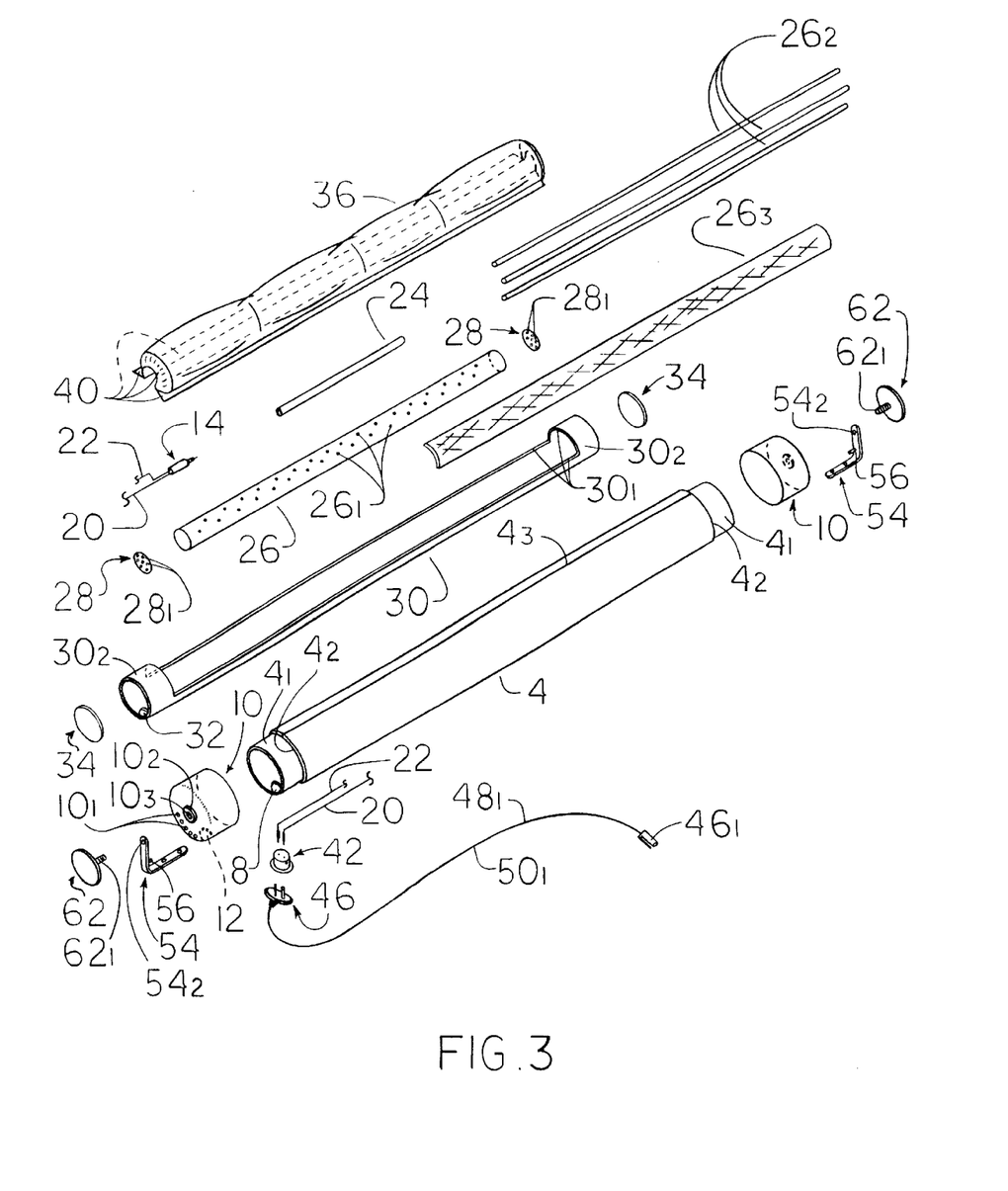
FIG. 3 Is an exploded view of the present invention showing all major components.

As illustrated and described by the drawings and other reference the present invention is a universal type pyrotechnically charged add-on air bag inflator 2 shown in the drawing (FIGS. 1 and 2), the cylindrical inflator comprises components depicted in the exploded view of (FIG. 3). The overall dimensions of inflator 2 are 16 inches in length by 2 inches in diameter for a standard size, though not limited to these dimensions.

Figure 1:
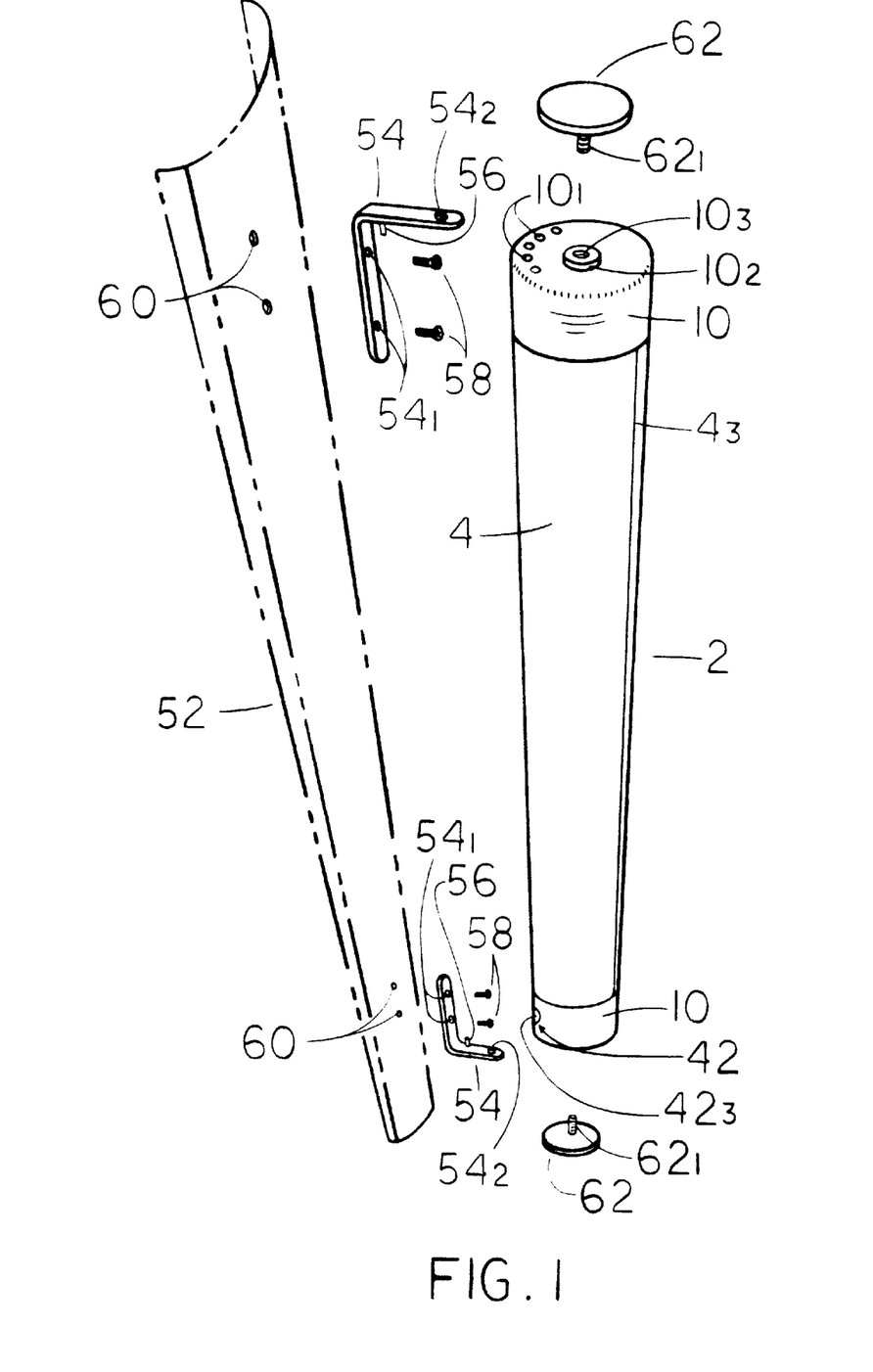
FIG. 1 Is a perspective view of the air bag inflator including installation hardware and is positioned to be installed on a vehicle's left forward pillar as seen from the diver's seat.
Figure 4:
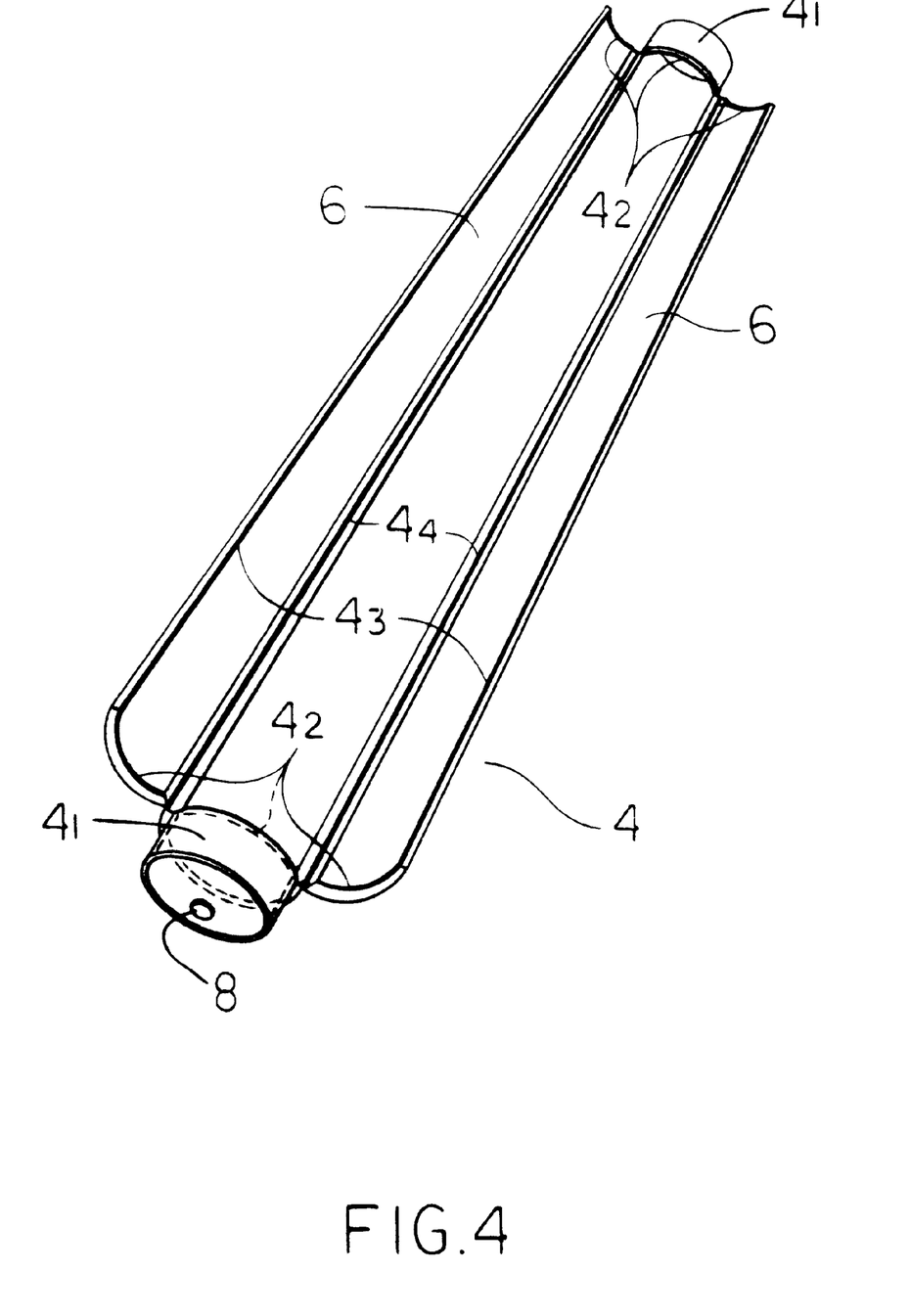
FIG. 4 Is a perspective of the outer shell with pop-open doors in the open position.
Figure 7:
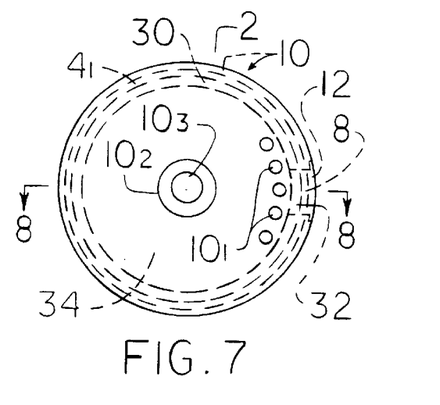
FIG. 7 A lower end view of the inflator (on a somewhat larger scale).
Figure 8:
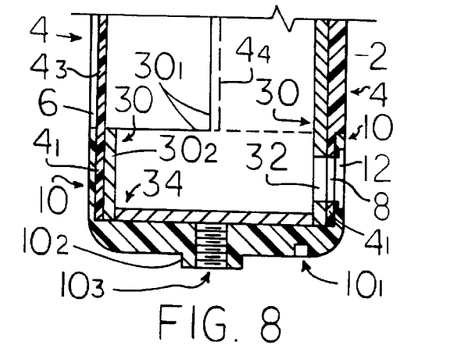
FIG. 8 Is a Partial section (lower portion) of the inflator as indicated by line 8—8, including only the baffle, outer-shell, and lower end cap.

A vinyl plastic elongated cylindrical outer shell 4 as seen in (FIGS. 1,3, and 4) having a portion of each end approximately one half the thickness of the major portion forming a pair of radial flange ends $4_1$, $4_1$, one to each end of outer shell 4 (FIGS. 3 and 4),and forming a pair of radially fracturable separation end seams $4_2$, $4_2$, one to each end of the outer shell as shown intact in the drawing (FIG. 3) and shown separated in (FIG. 4). The inside diameter of the outer shell remains constant throughout. Molded into the external surface and defining the front of outer shell 4 is a longitudinal groove continuing the full length of the major portion of the outer shell and forms a linearly fracturable separation front seam $4_3$ as shown intact in the drawing (FIGS. 1 and 3) and shown separated in (FIG. 4). Molded into the internal surface and defining the sides of outer shell 4 are two longitudinal grooves continuing the full length of the major portion of the outer shell and forming a pair of flexible side hinges $4_4$, $4_4$ bilateraly one side hinge $4_4$ to each side of the outer shell as shown in the drawing (FIG. 4). The Linear separation of front seam $4_3$ and the radial separation of end seams $4_2$, $4_2$ in combination with the outward bending of side hinges $4_4$, $4_4$ (upon system actuation) form a pair of elongated pop-open doors 6,6 Bilaterally symetrical, one to each side of front seam $4_3$ of outer shell 4, pop-open doors 6,6 shown in open position (FIG. 4). Receptacle hole 8 that will be further described, is located at and defines a rear side of (lower) flange end $4_1$ of outer shell 4 as shown in the drawing (FIGS. 3 and 4). A pair of vinyl plastic cup shaped end caps 10,10 (upper and lower) are sized to fit snugly over and close the respective open ends of outershell 4 as shown in drawing (FIGS. 1 and 3). A countersunk receptacle hole 12 that will be further described is located at and defines a rear side of (lower) end cap 10 as shown in (FIGS. 3, 7 and 8). Each end cap 10 contains on it's closed end a plurality of small (approximately ⅛ inch) diameter alignment recesses $10_1$ and a center portion riser $10_2$ wherein risers $10_2$, $10_2$ contain each a threaded hole $10_3$ as shown for the upper end cap in drawing (FIG. 1) and shown for the lower end cap (FIGS. 3, 7 and 8).

Figure 6:
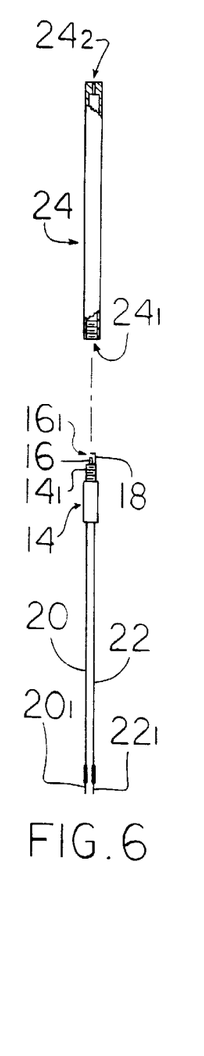
FIG. 6 Is a detail of the pyrotechnic elements (ignitor lower view and exploder upper view).

The Pyrotechnic elements of the inflation system comprise an insulated cylindrical spark plug-like ignitor 14 shown in (FIGS. 3 and 6) having a male threaded end $14_1$ at one end, including an isolated firing electrode 16, and an isolated ground electrode 18 thus creating an arc potential gap $16_1$ therebetween as shown in the drawing (FIG. 6). At the opposite end of ignitor 14 there extends two color coded wires, a red insulated lead wire 20 that is connected to firing electrode 16 and a green insulated ground wire 22 that is connected to ground electrode 18. Both the lead wire and the ground wire each extend from the lower end of ignitor 14 approximately 8 inches as shown in the drawing (FIGS. 3 and 6), (Colors and actual lengths not shown). Red lead wire 20 terminates in a connector pin $20_1$ and green ground wire 22 terminates in a connector pin $22_1$ shown in (FIG. 6). A cylindrical pyrotechnic exploder 24 as shown in drawing (FIGS. 3 and 6) contains an open female threaded end $24_1$ (FIG. 6) that is threadedly mated to male threads $14_1$ of ignitor 14, placing a ferrule bushing therebetween (not shown) for a pressure tight seal. The opposite end of exploder 24 contains a typical fill valve $24_2$ as shown in (FIG. 6) whereby exploder 24 can now be charged (pressurized) with an explosive gas (not shown).

Figure 5:
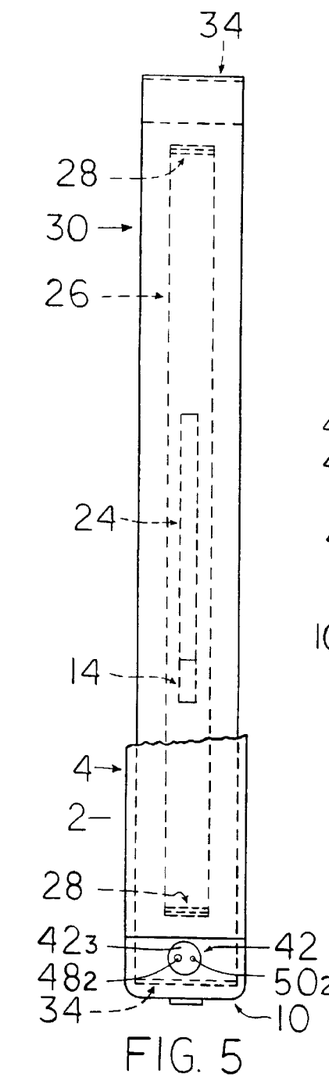
FIG. 5 Is a partial outline assembly of the inflator in rear elevation.
Figures 9, 14:
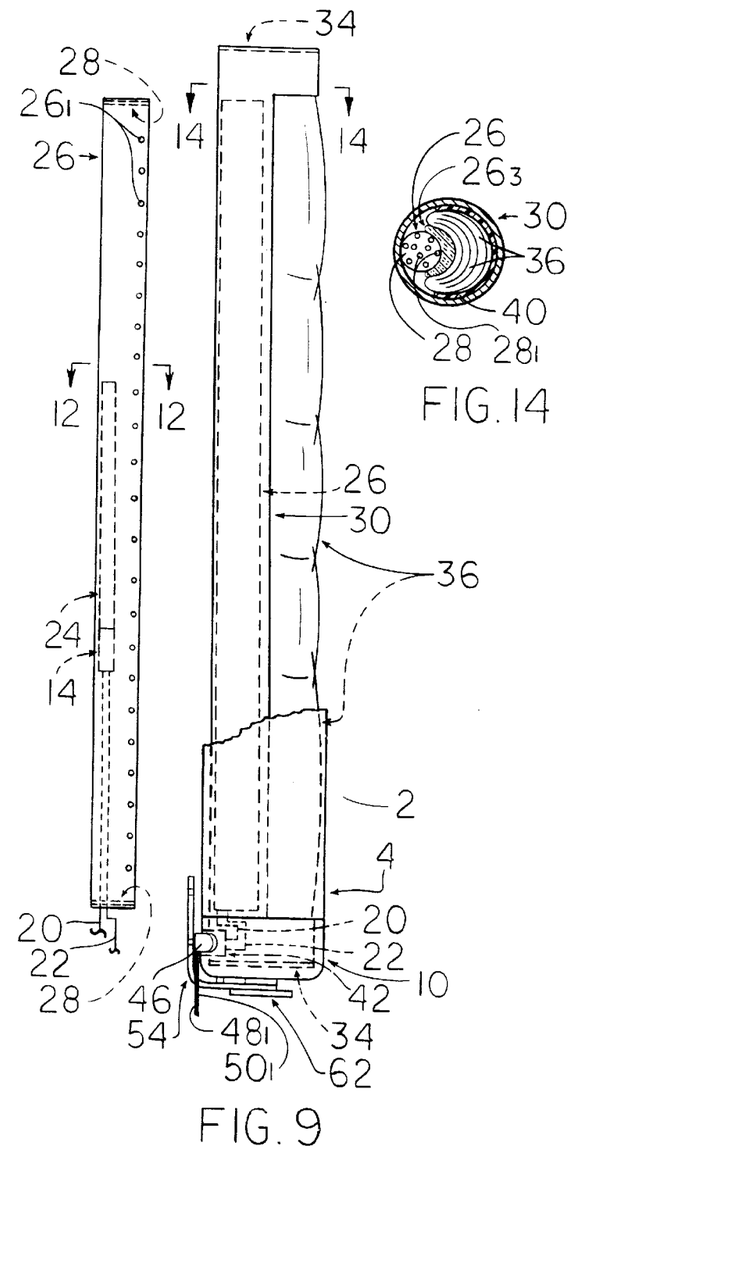
FIG. 9 A partial outline assembly of the inflator in left elevation showing the external plug connected between the inflator and the lower mounting bracket, left is an outline of the pyrotechnic elements within the chamber.
FIG. 14 Is a section of the upper portion of the baffle as indicated by line 14—14 including the upper portion of the air bag securing band and the chamber shield, and showing (not in sectional plane) the upper end piece of the chamber and the upper portion of the folded air bag.
Figure 12:
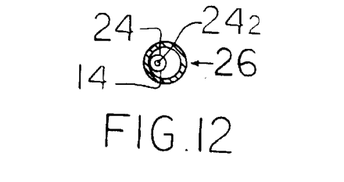
FIG. 12 Is a section of the chamber as indicated by line 12—12, including the top end of the exploder (not in sectional plane) and omitting the chamber tubes.
Figure 13:
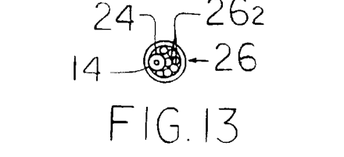
FIG. 13 Is a top end view of the chamber (excluding the top end piece) showing the top end of the exploder and the top end of the chamber tubes.

The pyrotechnic assembly consisting of exploder 24 and ignitor 14 is inserted and adhesively bonded (Adhesive not shown) into position longitudinally centered to the inside back of a steel elongated cylindrical combustion chamber 26 as shown in the drawing (FIGS. 5 and 9 left) in an eccentric relation as shown in the drawing (FIGS. 12 and 13). Lead wire 20 and ground wire 22 extend out of and define the lower end of chamber 26 and will be futher described. Chamber 26 includes a plurality of small venting holes $26_1$, where the venting holes are sufficient in diameter to serve collectively as orificial vents. Venting holes $26_1$ of chamber 26 are shown in (FIGS. 3 and 9 left). A plurality of small (approximately 3/16 inch) diameter hollow elongated thin metal chamber tubes $26_2$ shown in the drawing (FIGS. 3 and 13) are approximately ½ inch shorter than the length of chamber 26 and are longitudinally inserted into the chamber therein surrounding and compressing the assembled exploder 24 and ignitor 14 further securing the pyrotechnic assembly in place against the inside back of chamber 26 as shown in the drawing (FIG. 13). Chamber tubes $26_2$ aid in diffusing heat and expanding gases upon activation of the inflation system. To be secured into the open ends of chamber 26 are a pair of disc shaped steel end pieces 28,28 (FIG. 3) (Upper and Lower) that will partially close the respective open ends of the cylindrical chamber thereby enclosing the pyrotechnic assembly within chamber 26 shown in (FIGS. 5 and 9 Left). End pieces 28,28 include a plurality of small venting holes $28_1$ shown in (FIG. 3), and as shown for the upper end piece only in (FIG. 14).

Venting holes $28_1$ are sufficient in diameter to serve collectively as orificial vents. Lower end piece 28 includes two additional holes (not shown) sufficient in diameter to allow red lead wire 20 and green ground wire 22 (one hole for each wire) to be passed through lower end piece 28. End pieces 28,28 having sufficient diameters are machine pressed into respective open ends of chamber 26 to an approximate depth of ⅛ inch into the chamber as shown in (FIG. 9 left) (Caution to lead wire 20 and ground wire 22 now extending through lower end piece 28). Machine pressing the end pieces in place into the chamber leaves an approximate ⅛ inch outer rim at each end of the chamber that is inwardly and radially crimped (not shown) to secure end pieces 28,28 in place within chamber 26 and thereby leaving lead wire 20 and ground wire 22 extending from the lower end of chamber 26 shown in (FIG. 9 left). Venting holes $26_1$ serve to distribute rapidly expanding gases evenly through and out of the frontal length of chamber 26, and venting holes $28_1$ serve to distribute rapidly expanding gases evenly through and out of each end of chamber 26 upon activation of the inflation system. Chamber 26 will later be secured longitudinally centered to the inside back of a steel elongated cylindrical baffle 30 as shown in the drawing (FIGS. 5, 9 and 14). Chamber 26 and baffle 30 commonly face forward as shown in drawing (FIGS. 9 and 9 left), in an eccentric relation as shown in the drawing (FIG. 14).

Figure 15:
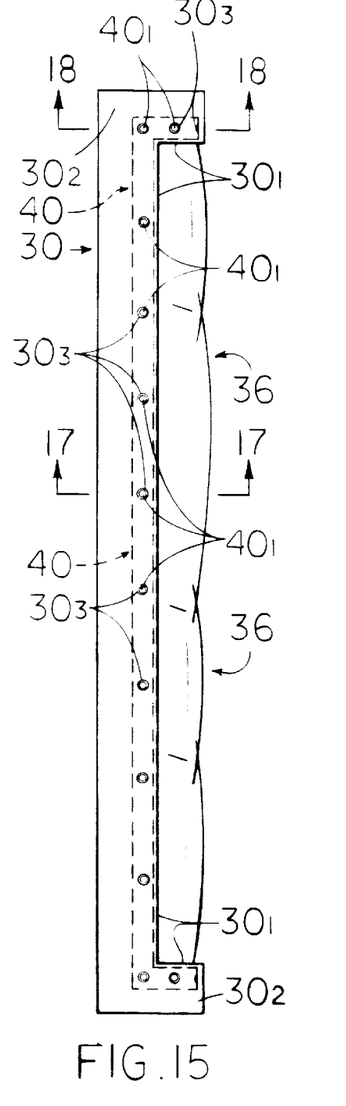
FIG. 15 The baffle in left elevation showing the position of the air bag securing band, and the chamfered holes of the baffle aligned to the threaded recesses of the air bag securing band.
Figure 17:
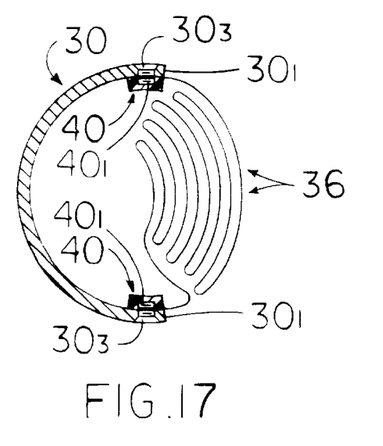
FIG. 17 Is a section of the air bag securing band attachment to the mid portion of the baffle (on a somewhat larger scale) as indicated by line 17—17.
Figure 18:
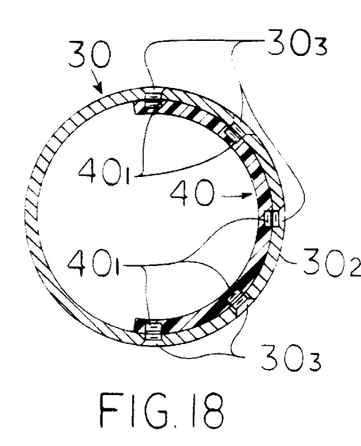
FIG. 18 Is a section of the air bag securing band attachment to the upper portion of the baffle (on a somewhat larger scale) as indicated by line 18—18.

The elongated open (cut-away) portion of baffle 30 forms a perimeter edge $30_1$ and forms a pair of full ends $30_2,30_2$, one to each end of baffle 30 as shown in the drawing (FIGS. 3 and 15). The cylindrical baffle is sufficient in diameter to (later) be snugly fitted by insertion into the cylindrical outershell where full ends $30_2,30_2$ of Baffle 30 are equal in length to flange ends $4_1,4_1$ of outer shell 4. Baffle 30 contains a plurality of small (approximately ⅛ inch) diameter chamfered holes $30_3$ (chamfered to the outside) along and adjacent to edge $30_1$ of the baffle, holes $30_3$ are shown in (FIGS. 15, 17 and 18). A receptacle hole 32 is located at and defines the rear side of the lower end of baffle 30 (FIGS. 3, 7 and 8) that will be further described. To be secured into the open ends of baffle 30 are a pair of disc shaped steel end pieces 34,34 as shown in (FIG. 3) (Upper and lower) that will fully close the Respective open ends of the cylindrical baffle. End Pieces 34,34 are welded flush into respective open ends of baffle 30. End pieces 34,34 shown in drawing (FIGS. 3, 5 and 9), lower end piece 34 shown in section (FIG. 8). Two mounting clips of a common type are tac welded to the inside back of baffle 30 (not shown) spaced appropriately to secure chamber 26 to baffle 30 where the chamber is accommodated within the baffle in the aforementioned position as shown in the drawing (FIGS. 5, 9 and 14). Red lead wire 20, and green ground wire 22 extending out of the lower end of chamber 26 as shown in (FIG. 9 left) are now in the lower end of baffle 30 and are temporarily left coiled inside the baffle (not shown). A porous woven flexible fiberglass shield $26_3$ as shown in drawing (FIGS. 3 and 14) is dimensioned to the inside length and width of baffle 30 and is placed over the front of chamber 26 where shield $26_3$ is tucked around the sides of the chamber as shown in drawing (FIG. 14) to further aid in diffusing heat upon activation of the inflation system.

Inflator 2 contains a flexible developing membrane air bag 36 that is shown inflated and developed in the drawing (FIG. 2), and is shown in a folded configuration in the drawing (FIGS. 3, 9, 14, 15 and 16).

Figure 16:
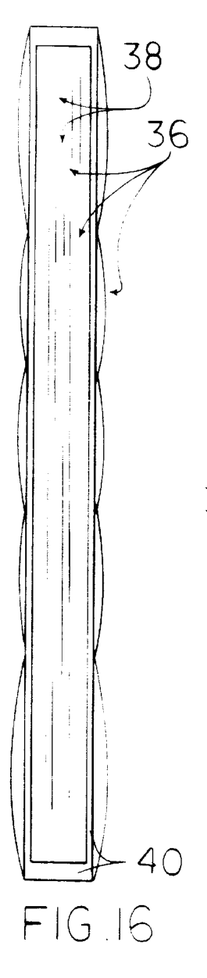
FIG. 16 Is a rear elevation of the folded air bag showing the air bag securing band to be continuous surrounding the elongated air bag opening.

The membrane air bag contains an elongated opening 38 at the rear side of air bag 36 as shown in the drawing (FIG. 16). The surrounding edges of opening 38 are permeated to a semi-pliable elongated nylon securing band 40 as shown in the drawing (FIG. 16) wherein band 40 is configured to the shape of the inside surface of baffle 30 adjacent to edge $30_1$, as shown in the drawing (FIGS. 15, 17 and 18). Band 40 contains a plurality of small (approximately ⅛ inch) diameter female threaded recesses $40_1$ in matching alignment to chamfered holes $30_3$ of baffle 30 shown in drawing (FIGS. 15, 17, and 18 only). With the uninflated air bag in an unfolded stated (not shown) band 40 of air bag 36 is positioned into the accommodating baffle where band 40 is adhesively bonded (adhesive not shown ) to the inside surface of baffle 30 adjacent to edge $30_1$ where holes $30_3$ and recesses $40_1$ are aligned as shown in the drawing (FIGS. 15, 17 and 18). A plurality of standard flat head screws (not shown) are aligned through holes $30_3$ and tightly threaded into recesses $40_1$ to further secure and seal band 40 of air bag 36 to baffle 30. Air bag 36 is folded and accommodated within baffle 30 as shown in the drawing (FIGS. 9 and 14).

Figure 11:
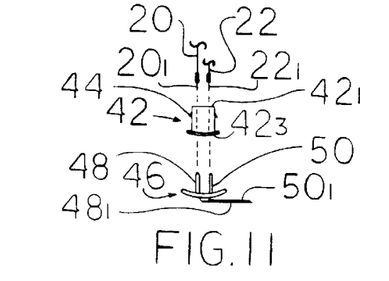
FIG. 11 A detail of the external plug (lower view) and the receptacle (upper view).

Baffle 30 containing internal components including the folded air bag is now accommodated within outer shell 4 as aforementioned, positioning the upper and lower ends of baffle 30 and the upper and lower ends of outer shell 4 flush and respective to each other. The baffle and outer shell relation (lower portion) is shown in the section drawing (FIG. 8). Receptacle hole 32 located at the lower end of baffle 30 and receptacle hole 8 located at the lower end of outer shell 4 are aligned to each other as shown in (FIGS. 7 and 8), therefore each side of perimeter edge $30_1$ of baffle 30 will be aligned to approximately ⅛ inch forward of each respective side hinge $4_4$ of outer shell 4 as seen in the lower left portion only of section drawing (FIG. 8). End caps 10,10 of inflator 2 are adhesively bonded (adhesive not shown) and fitted snugly over radial flange ends $4_1,4_1$ of outer shell 4 respectively with receptacle hole 12 of lower end cap 10 aligned to receptacle hole 8 of outer shell 4 as shown in drawing (FIGS. 7 and 8). Recesses $10_1$ of respective end caps 10,10 are positioned to the rear of the inflation system as shown in the drawing (FIGS. 1, 3, 7, and 8). Red lead wire 20 and green ground wire 22 previously left coiled inside baffle 30 are fished out through open and aligned receptacle holes 8, 12, 32. Red lead wire 20 and green ground wire 22 are then connected to a cylindrical connecting receptacle 42 at an inward side $42_1$ of the receptacle as shown in the drawing (FIG. 11 upper) where inward side $42_1$ contains two color dot coded locking receptor holes (not shown). The locking receptor holes are sized to receive connector pin $20_1$ and connector pin $22_1$ shown in the drawing (FIG. 11 upper). Connector pin $20_1$ is connected to a red coded locking receptor hole for lead connection and connector pin $22_1$ is connected to a green coded locking receptor hole for ground connection. To now insert receptacle 42 into inflator 2, the excess of lead wire 20 and ground wire 22 is pushed back into and through the open and aligned receptacle holes 8, 12, 32. Receptacle 42 is adhesively bonded (adhesive not shown) and inserted into the open receptacle holes of inflator 2 from inward side $42_1$ of the receptacle. The cylindrical sides of receptacle 42 contain a plurality of spring locks 44 shown in (FIG. 11 upper), spring locks 44 lock to the inside surface of baffle 30 when the receptacle is fully inserted into the inflator (locking not shown). Receptacle 42 is radially flanged at an outward side $42_3$ as shown in (FIG. 11 upper) to obtain a radially flush fit to the radial outer surface of lower end cap 10 as shown in (FIG. 1) where receptacle hole 12 of end cap 10 is countersunk (FIGS. 7 and 8). Receptacle 42 is shown inserted in the rear side of lower end cap 10 of inflator 2 in the drawing (FIGS. 5 and 9) and shown connected to lead wire 20 and ground wire 22 in the drawing (FIG. 9).

Figure 10:
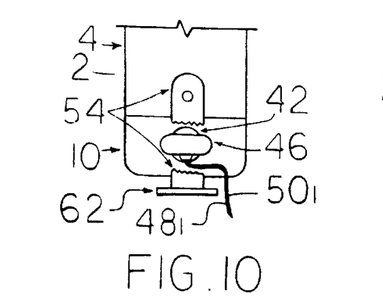
FIG. 10 Is a rear elevation of the lower portion of the inflator showing the outer face of the external plug in place.

Connecting to inflator 2 is a radially curved external plug 46 (FIG. 11 lower) where the radial curve of external plug 46 matches the radial outer surface of lower end cap 10 of the inflator. External plug 46 contains a lead prong 48 connected to a lead wire $48_1$, and a ground prong 50 connected to a ground wire $50_1$, lead prong 48 being large in diameter than ground prong 50 as shown in drawing (FIG. 11 lower). External plug 46 connects to receptacle 42 located at the rear side of lower end cap 10 of inflator 2 as shown in (FIGS. 9 and 10). The outward side $42_3$ of Receptacle 42 contains an open hole lead receptor $48_2$ and an open hole ground receptor $50_2$, lead receptor $48_2$ being larger in diameter than ground receptor $50_2$ as shown in (FIG. 5). External plug 46 is inserted into the respective open hole receptors of receptacle 42 and fitted flush to inflator 2 as shown in the drawing (FIGS. 9 and 10). Lead wire $48_1$ and ground wire $50_1$ of external plug 46 extend approximately 48 inches each (full lengths not shown) and terminate in a usual (shape coded) locking harness connector $46_1$ as shown in drawing (FIG. 3).

The inflator is preferably but not limited to installation on a vehicle forward pillar 52 as shown in the drawing (FIGS. 1 and 2), in a longitudinal manner to the pillar, using a pair of (semi pliable) nylon right angle brackets 54,54 spaced appropriately to accommodate inflator 2 at upper and lower ends as seen in the drawing (FIGS. 1 and 3). Each bracket 54 is adhesively bonded (adhesive not shown) to the pillar in combination with a plurality of flat head self tapping screws 58 through a plurality of chamfered holes $54_1$ of each bracket, whereby tapping screws 58 are tapped into a plurality of drilled holes 60 spaced appropriately in pillar 52 as shown in the drawing (FIG. 1). Brackets 54,54 further include each a through hole $54_2$ and each a locking pin 56 as shown in the drawing (FIG. 1) to allow attatchment of inflator 2 to (mounted) brackets 54,54 and to allow rotational alignment and lock positioning of inflator 2. The lower end of inflator 2 is placed to lower bracket 54 first simultaneously bearing down to flex lower bracket 54 sufficient to allow positioning of the upper end of inflator 2 into place with upper bracket 54 where attatchment is the same for upper and lower ends of inflator 2. The top of upper end cap 10 is shown in (FIG. 1), the bottom of lower end cap 10 is shown in (FIGS. 3, 7 and 8). Threaded hole $10_3$ of each end cap 10 is aligned to respective hole $54_2$ of each bracket 54 (FIGS. 1 and 3) and locking pin 56 of each bracket 54 is inserted into appropriate alignment recess $10_1$ of respective end cap 10 (FIGS. 1 and 3). The longitudinal front face of inflator 2 is aligned approximately parallel to the vehicle wind shield (not shown). Inflator 2 is then secured to brackets 54,54 using a pair of disc shaped flat head nylon cap screws 62,62 (upper and lower) where a threaded shaft $62_1$, of each cap screw 62 is threadedly mated and tightened to respective threaded hole $10_3$ of each each cap 10 (FIGS. 1 and 3). External plug 46 is thereby locked between inflator 2 and lower bracket 54 as shown in drawing (FIGS. 9 and 10). Harness connector $46_1$ with lead wire $48_1$ and ground wire $50_1$ as shown in (FIG. 3) is routed to forward engine compartment or other appropriate area of the vehicle (not shown) in a concealing and protective manor where harness connector $46_1$ is connected to an electrical initiator source (not shown) to initiate activation of the inflator in response to an impact (25 to 35 MPt) of a vehicular collision thereupon producing inflation and development of the air bag inflation system.

Air bag 36 accommodated within the inflation system whether for driver and/or passenger installation includes sufficient surface area to inflate and envelop over a vehicle steering wheel upon activation of the inflation system as shown in (FIG. 2), thus in the case of driver air bag deployment the air bag develops between interior vehicle surfaces (including the steering wheel) and the occupant. Air bag 36 further includes a plurality of pliable restrictive flow pressure relief vents $36_1$ as seen in the drawing (FIG. 2) to automatically relieve internal pressure of the inflated air bag once full inflation has occurred.

Figure 19:
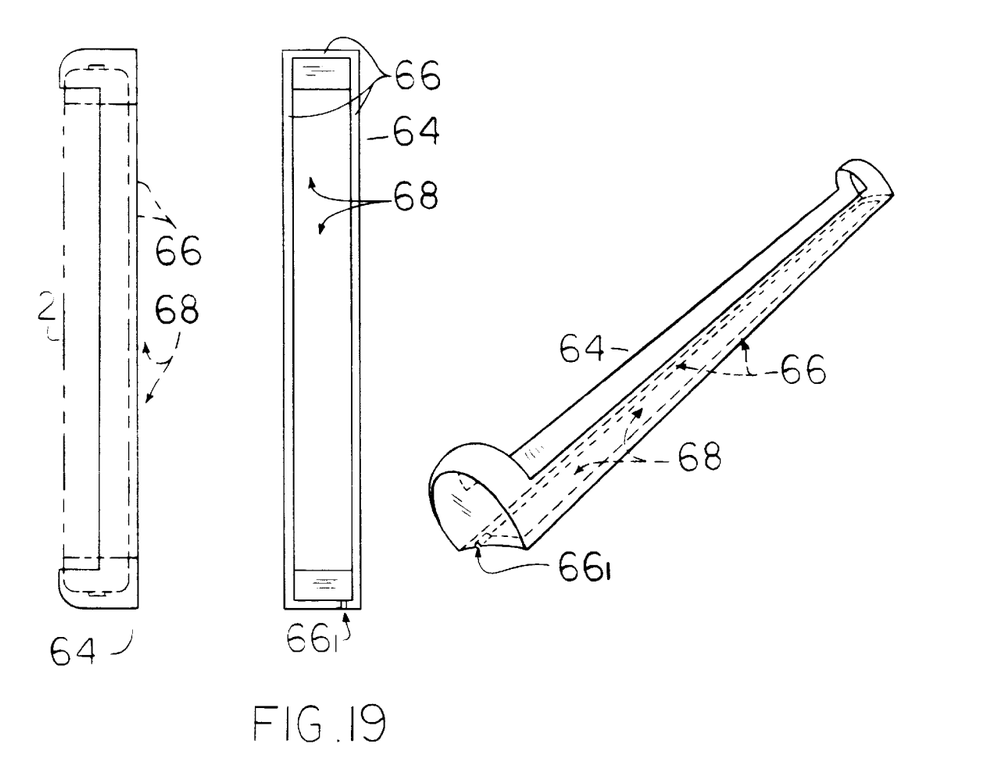
FIG. 19 A rear elevation of the accessory option cover casing, right is a perspective of the cover casing, left is a right elevation of the cover casing in place partially covering a phantom outline of the inflator (all views on a reduced scale).

A first accessory option as related to the present invention of (FIGS. 1–18) will now be described in connection with (FIGS. 19, 19 left, and 19 right). An elongated thin wall vinyl plastic cover casing 64 having an elongated front portion open (cut-away) as shown in the drawing (FIG. 19 right). Casing 64 is configured to fit over and cover the ends and sides of inflator 2 after the inflator has been installed to provide a more custom look to the inflation system as shown in the drawing (FIG. 19 left). The rear side of casing 64 contains an elongated opening 68 as shown in the drawing (FIGS. 19 and 19 right) dimensioned to fit snugly over the installed inflator thereby the inflator holds casing 64 in place. The cover casing is further secured by an adhesive backed glue strip 66 which surrounds opening 68 at the rear side of casing 64 as shown in the drawing (FIGS. 19 and 19 right). Glue strip 66 is adhesively bonded (adhesive not shown) to the vehicle at the pillar on which the inflator has been installed. The operational front of inflator 2 remains exposed to permit normal operative function of the inflator upon activation. A wiring tunnel $66_1$ as shown in the drawing (FIGS. 19 and 19 Right) is located at and defines the lower end of casing 64. Wiring tunnel 66₁ allows the external wiring of the inflation system to pass around and behind the closed lower end of casing 64 with the back side of the cover casing remaining flush to the vehicle pillar.

Figures 20A, 20B:
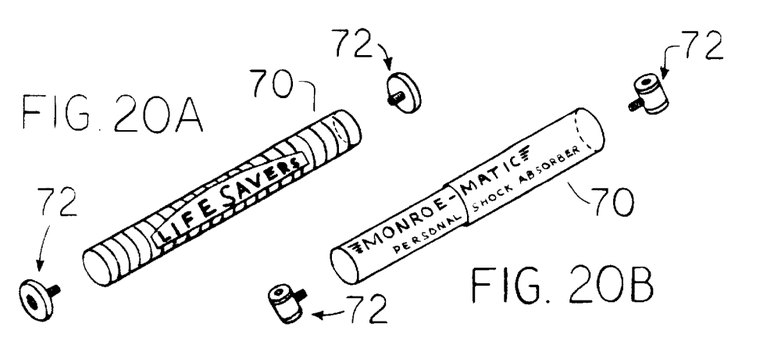
FIG. 20A A perspective of the accessory option cover sleeve including custom cap screws according to a first embodiment (on a reduced scale).
FIG. 20B A perspective of the accessory option cover sleeve including custom cap screws according to a second embodiment of FIG. 20A.

A second accessory option as related to the present invention of (FIGS. 1–18) according to a first embodiment will now be described in connection with (FIG. 20A). A thin wall flexible foam cover sleeve 70 as shown in the drawing (FIG. 20A). The cover sleeve is configured to fit snugly over and cover the full diameter of inflator 2 while leaving open the ends of the inflator. Sleeve 70 can be installed during or after installation of inflator 2 and includes a hidden longitudinally perforated separation seam (not shown) to allow full separation and clearance of sleeve 70 from inflator 2 upon activation of the inflator. A pair of nylon custom cap screws 72,72 as shown in the drawing (FIG. 20A) is substituted for cap screws 62,62 of (FIG. 1) when using the optional cover sleeve. Sleeve 70 is configured to simulate an over sized candy package and contains on the front outer surface (longitudinally printed) the Logo "LIFE SAVERS" (Life Savers is a registered trade mark of Nabisco, Inc.) including the associated color scheme (Color scheme not shown). Cap screws 72,72 as shown in the drawing (FIG. 20A) are configured to simulate individual "LIFE SAVERS" candy pieces.

A second accessory option as related to the present invention of (FIGS. 1–18) according to a second embodiment will now be described in connection with (FIG. 20B). A thin wall flexible foam cover sleeve 70 similar to the drawing (FIG. 20A) but where cover sleeve 70 as shown in (FIG. 20B) is configured to simulate an automotive shock absorber and contains on the front outer surface (longitudinally printed) the logo "MONROE-MATIC" (Monroe-Matic is a registered trade mark of Monroe Inc.) and the printed subtitle, personal shock absorber, including the associated color scheme (color scheme not shown). A pair of nylon custom cap screws 72,72 as shown in the drawing (FIG. 20B) is substituted for cap screws 62,62 of (FIG. 1) when using the optional cover sleeve. Cap screws 72,72 (FIG. 20B) are configured to simulate individual shock absorber mounting bushings.

OPERATIONAL DESCRIPTION

Operation of the present invention is a sequence of events all of which take place in an instant as the result of an impact (25–35 MPH) due to collision. An initiator is activated on impact and communicates an electrical charge to ignitor 14 producing an electrical arc at arc potential gap 16₁ between firing electrode 16 and ground electrode 18 (FIG. 6), thereby igniting the pressurized explosive gas and instantly rupturing exploder 24. Rapidly expanding gases are released into chamber 26 where chamber tubes 26₂ (FIG. 13) begin diffusing heat and pressure and where venting holes 26₁ and venting holes 28₁ allow venting and even distribution of expanding gases into baffle 30 therein forcing and directing expanding gases into opening 38 of air bag 36 causing expansion of air bag 36 thereby fracturing front seam 4₃ and end seams 4₂,4₂ of outer shell 4 causing elongated pop open doors 6,6 to swing outwardly open from respective side hinges 4₄,4₄ (FIG. 4), thus allowing full inflation and development of air bag 36 (FIG. 2)(driver and passenger inflator development illustration). Once full inflation has occured, vents 36₁ automatically relieve internal pressure of air bag 36.

Now having described a preferred embodiment of the invention including embodiments of related accessory options this description should not be construed as limiting the scope of the invention but as illustrations of the preferred embodiment and embodiments of related accessory options, for example the invention is preferably but not limited to installation on a vehicle forward pillar; the inflator in cross section is preferably but not limited to being round in shape; the pyrotechnic elements may be of varying form and composition, the related accessory option covers may be of another form and composition, without departing from the intended purpose and scope of the invention. Therefore the spirit and scope of the invention should be limited only by the appended claims and their legal limitations rather than by the illustrations and description given.

I claim:

1. An air bag inflator for safety assistance to an occupant of a motor vehicle during a collision and is configured to install on a structural member of said vehicle, therewith said inflator comprising:

(a) a pyrotechnic exploder and ignitor for providing explosive energy;

(b) an elongated cylindrical combustion chamber means surrounding and encasing said exploder and said ignitor for controlling force of said explosive energy;

(c) an elongated cylindrical baffle means including an elongated front portion opening of said baffle means whereas said baffle means partially surrounds and encases said chamber means thereby controlling directional flow of said explosive energy;

(d) an air bag in an uninflated state and is folded in an elongated configuration longitudinally adjacent to said baffle means and an elongated securing band means that is connected to said air bag wherein said band means is connected therein to said opening of said baffle means;

(e) an elongated cylindrical yieldable encasement means for encapsulating and including all of said components, wherein the improvement comprises a plurality of support member means for said inflator to be generically applicable and allowing said inflator to be rotatively alignable along the long axis of said inflator and a plurality of elongated yielding door means within said encasement means for said encasement means to yield in a longitudinal manner when said air bag is inflated thereby allowing said air bag to develop in a lateral direction parallel to a frontal plane in front of said occupant thus preventing developmental impact of said air bag thereinto said occupant.

2. An air bag inflator according to claim 1 wherein said inflator is configured to install in said vehicle on the external surface of the interior facing of a structural support pillar in which said inflator is positioned longitudinally parallel to said pillar.

3. An air bag inflator according to claim 1 wherein said inflator is connected by electrical means to initiate automatic deployment of said air bag thereupon collision of said vehicle.

4. An air bag inflator according to claim 1 wherein said inflator includes a plurality of cover means to provide superficial appearance options.

\* \* \* \* \*